(No Model.) 4 Sheets—Sheet 2.
W. R. STOVER.
COMPUTING SCALE.
No. 531,229. Patented Dec. 18, 1894.
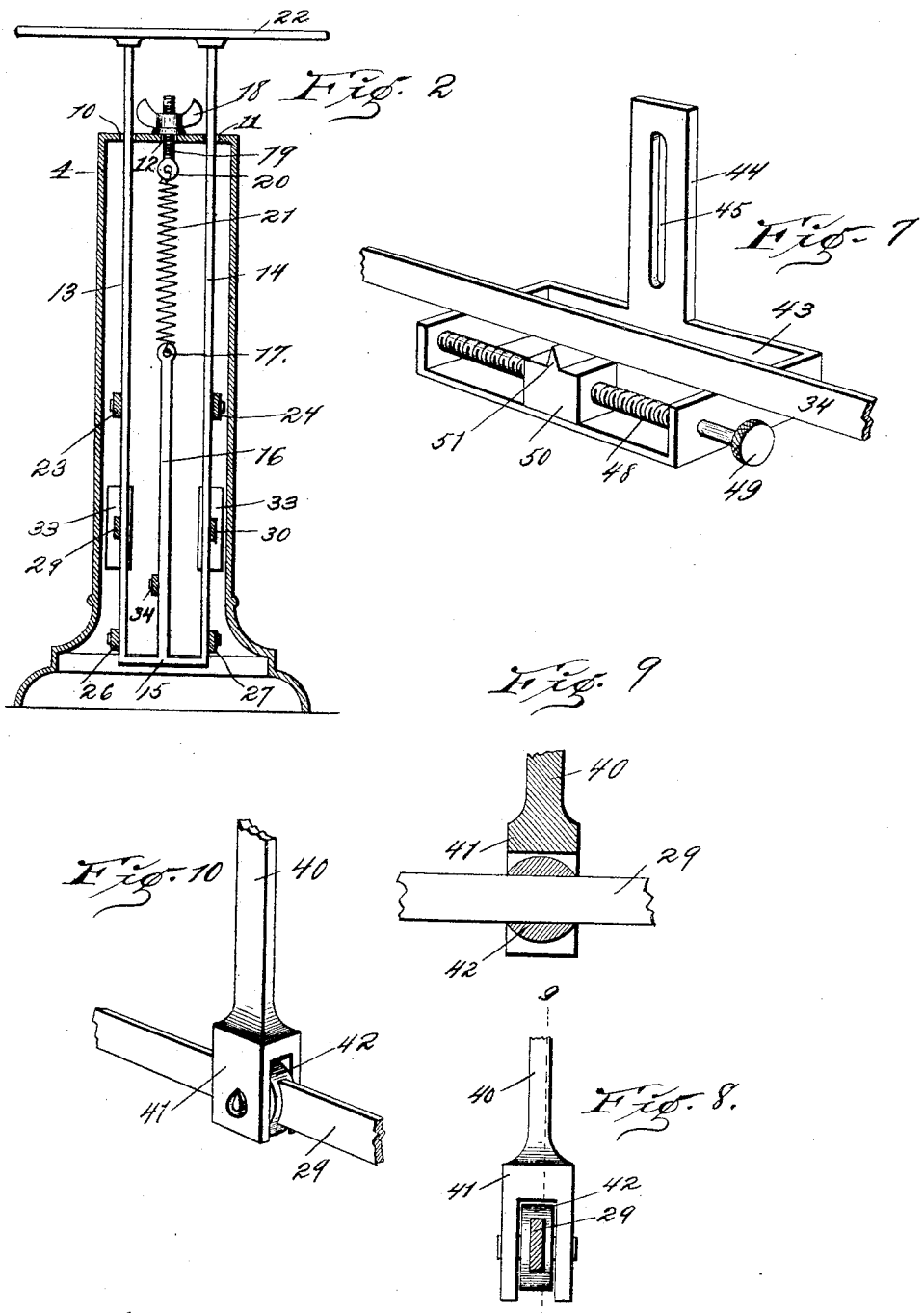
Attest
M. P. Smith
Wm J. Sankey
Inventor:-
Wm R. Stover
By Higdon & Higdon & Longan
Attys.

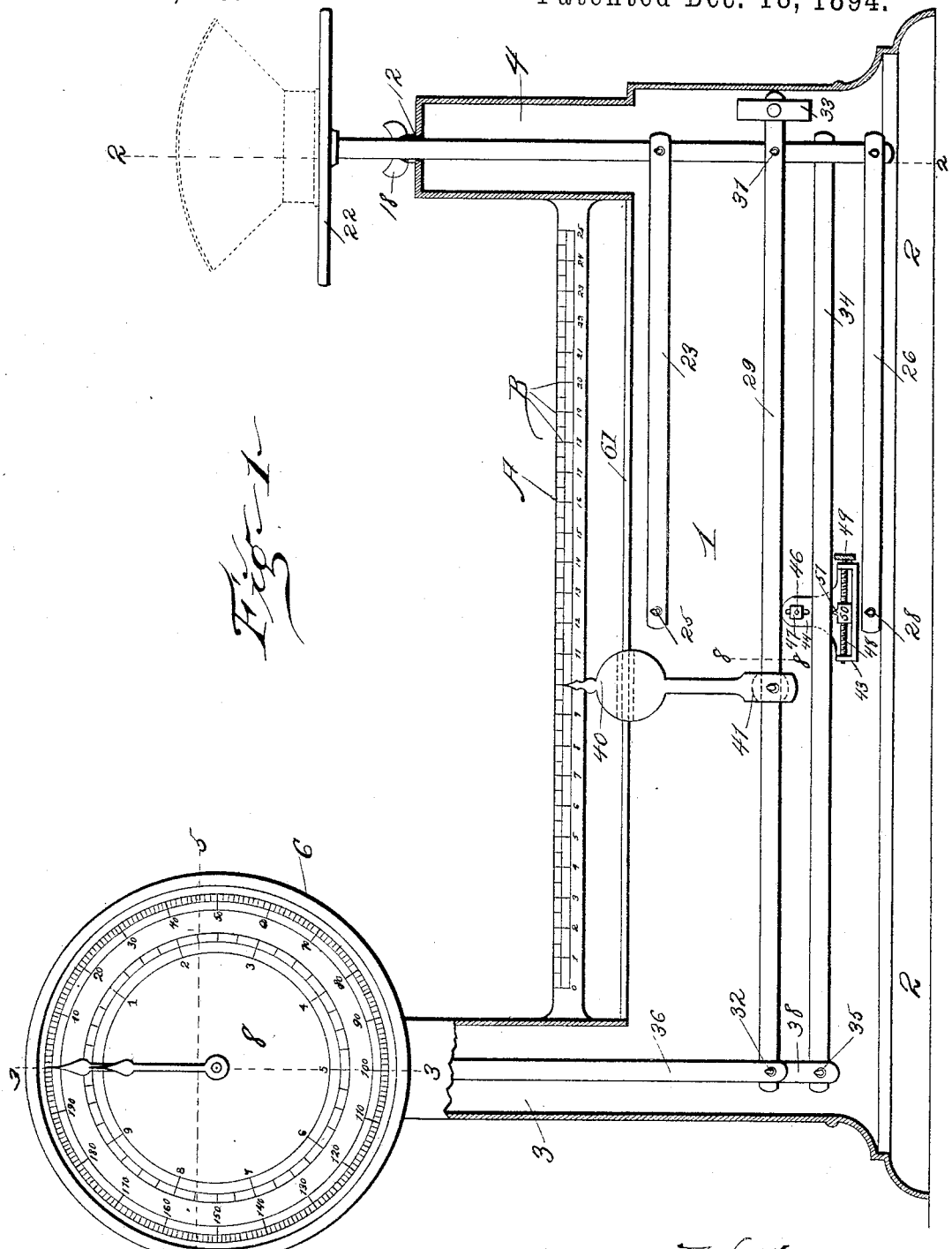

(No Model.) 4 Sheets—Sheet 3.
W. R. STOVER.
COMPUTING SCALE.
No. 531,229. Patented Dec. 18, 1894.
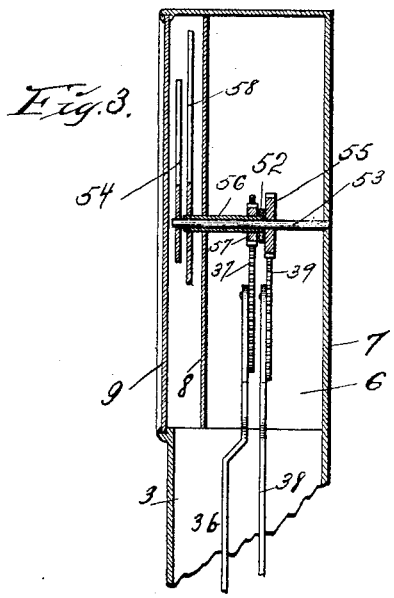
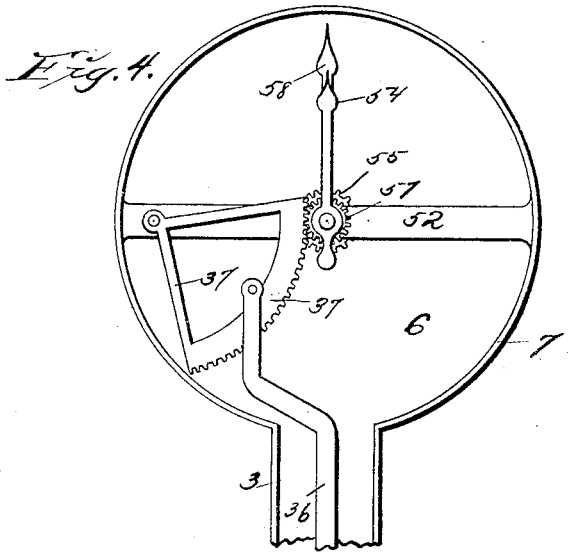
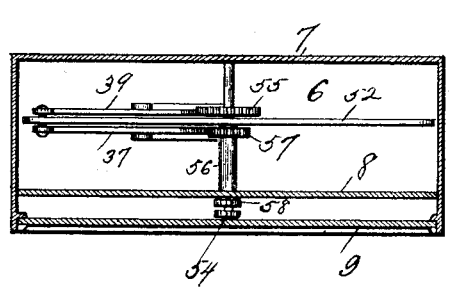
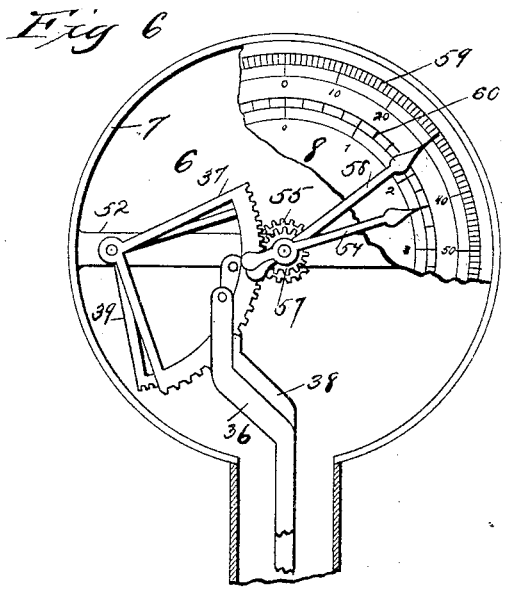
Attest:
M. P. Smith
Wm. J. Sankey
Inventor:
Wm. R. Stover
By Higdon, Higdon & Longan
Attys.

(No Model.)  4 Sheets—Sheet 4.

W. R. STOVER.
COMPUTING SCALE.

No. 531,229. Patented Dec. 18, 1894.

Attest
M. P. Smith.
A. A. Blankemeister.

Inventor:
Wm. R. Stover
by Higdon & Higdon & Longan
Atty's

UNITED STATES PATENT OFFICE.

WILLIAM R. STOVER, OF ST. LOUIS, MISSOURI, ASSIGNOR OF ONE-HALF TO CAREW C. SANDERS, OF SAME PLACE.

COMPUTING-SCALE.

SPECIFICATION forming part of Letters Patent No. 531,229, dated December 18, 1894.

Application filed March 5, 1894. Serial No. 502,332. (No model.)

*To all whom it may concern:*

Be it known that I, WILLIAM R. STOVER, of the city of St. Louis, State of Missouri, have invented certain new and useful Improvements in Computing-Scales, of which the following is a full, clear, and exact description, reference being had to the accompanying drawings, forming a part hereof.

The object of my invention is to produce an improved weighing and price scale, that is simple in construction, practically automatic in its workings and efficient in use.

To the above purposes my invention consists in certain new and novel features of construction that will be hereinafter described and claimed.

Figure 11:
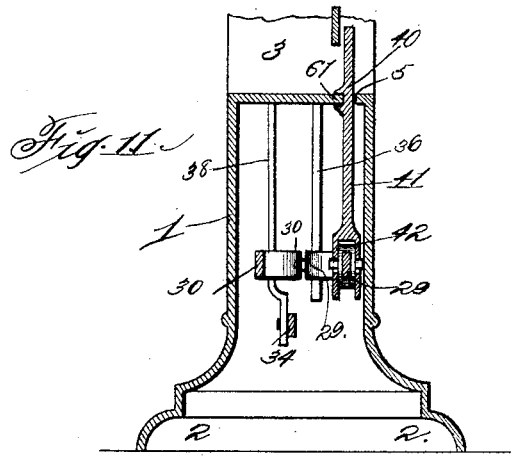
Figure 12:
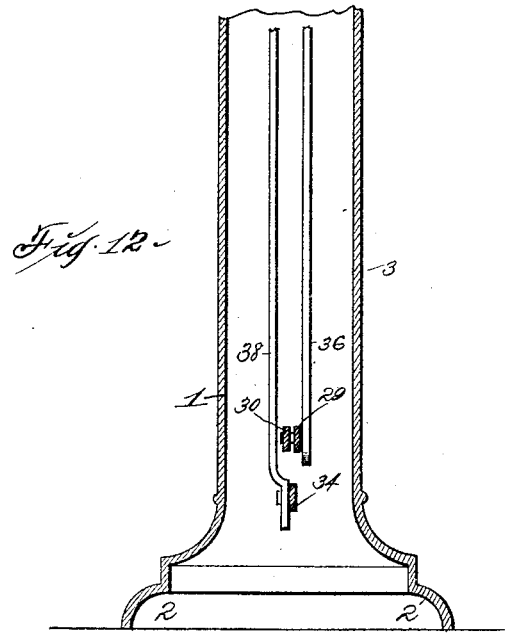

Figure 1 is a longitudinal vertical sectional view of my complete scale, a portion of same being left in full lines. Fig. 2 is a vertical transverse sectional view, taken on the line 2—2 of Fig. 1. Fig. 3 is a vertical sectional view taken on the line 3—3 of Fig. 1. Fig. 4 is a front elevation of my cost and weighing indicator, the face of same being removed. Fig. 5 is a longitudinal sectional view taken on the line 5—5 of Fig. 1. Fig. 6 is a front view of my indicator, a portion of the indicating dial being broken away to show the mechanism located within the indicator. Fig. 7 is a perspective view of a longitudinally sliding bearing used in my improved scale. Fig. 8 is an enlarged cross-sectional view on the line 8—8 of Fig. 1, showing a sliding fulcrum used in my scale. Fig. 9 is a cross-sectional view taken on the line 9—9 of Fig. 8. Fig. 10 is a perspective view of this sliding fulcrum. Fig. 11 is a vertical transverse sectional view taken closely-adjacent the indicating-finger 40, of Fig. 1. Fig. 12 is a vertical transverse sectional view taken adjacent the vertical bar 36 at the left hand of Fig. 1.

Similar figures and letters refer to similar parts throughout the several views.

The numeral 1 designates the main frame or body of my improved scale, it being rectangular in form and provided with a molding or extending base 2, and at either end is the upwardly extending rectangular chambers 3 and 4. A slot 5 extends longitudinally from the inner walls of these chambers 3 and 4. Immediately above this slot, and extending from the upwardly extending frames 3 and 4 is a bar A provided on its face with equidistant marks B, whose purpose will be presently shown.

An indicator 6 is mounted upon the upwardly extending frame 3, and is constructed of a circular casing 7, in which is located the indicator-face 8, and the glass 9. The top plate of the upwardly extending frame 4 is provided with three openings 10, 11 and 12. Extending downwardly through these openings 10 and 11 are vertical bars 13 and 14 rigidly secured at their lower ends by the longitudinal bar 15. At a central point between these vertical bars 13 and 14, and extending in the same vertical plane with them, is a bar 16 provided at its upper end with an eye 17.

Extending through the opening 12, and provided on its outer end with a winged-nut 18, is a screw-bolt 19 provided at its lower end with an eye 20. A tension-spring 21 connects this eye 20 with the eye 17 previously mentioned.

On top of the vertical bars 13 and 14 is the platform 22, upon which the goods or commodities are to be placed and weighed.

In Fig. 1 a scoop is shown in dotted lines located upon this platform 22. On the outside of the vertical bars 13 and 14, and at a point near their centers, are pivoted guide-bars 23 and 24. These guide-bars lie longitudinally within the base frame 1 and are pivoted half way between the ends of said base frame. This rear pivot point is designated by the numeral 25. Guide-bars 26 and 27, identical with the bars 23 and 24, are pivoted to the lower ends of the vertical bars 13 and 14, and also to the central portion of the inside of the base frame 1, this rear pivot point being designated by the numeral 28.

Parallel beams 29 and 30 extend longitudinally the entire length of the base frame 1 and are pivoted to the outside of the vertical bars 13 and 14 at 31, and have pivot points 32 on their forward ends. The portions of these beams that extend beyond the vertical bars 13 and 14 are provided with sliding-weights 33. A single beam 34 is pivoted to the central vertical bar 16, and extends longitudinally within the base frame 1, and has a pivot point 35 on its forward end.

The beams 29 and 30 are pivoted at their forward ends to a vertically extending bar 36 which passes upward through the portion 3, and is attached to a segmental-rack 37 which will be presently described.

The beam 34 is pivoted to a vertically extending bar 38, which is a counterpart of the vertical bar 36, and which at its upper end is attached to a segmental-rack 39.

The fulcrum for the beam 29 is made in the following manner:

An indicating finger 40 is mounted to slide freely upon a horizontal guide 61 in the slot 5 of the frame or casing, and provided with a downwardly extending protion 41, said portion 41 being bifurcated, within which is pivoted a disk 42. This disk 42 is provided with a rectangular opening in which the beam 29 slides. By reason of the disk being pivoted within the portion 41, and the beam 29 sliding within the disk 42, it will be seen how a longitudinally sliding fulcrum is formed.

The fulcrum for the beam 34 is provided in the following manner: A rectangular frame 43 is provided with an upwardly extending portion 44, in which a slot 45 is formed. A bolt 46 passing through the side-wall of the frame 1, slot 45, and there provided with a nut 47, form the means for normally holding this frame 43 rigid, and also allow it to be adjusted vertically. Extending longitudinally of the frame 43, near its front portion, is a screw-bolt 48 having the head 49 located upon the outside of the frame 43. Located upon this screw-bolt 48 is a rectangular block 50 and provided with an upwardly extending portion 51, which is inverted V-shaped in its cross-section. Upon this inverted V-shaped portion 51 rests the beam 34. By manipulating the head 49, the block 50 carrying the bearing 51, may be longitudinally adjusted. Thus it will be seen how a vertical and longitudinal fulcrum is formed for the beam 34.

The cylindrical casing 7, previously mentioned, is provided with a cross-bar 52, upon each side of and to which are pivoted the segmental racks 37 and 39, previously mentioned. A shaft 53, located at a central point in this casing 7 and passing through this cross-bar 52, is provided on its forward end and between the indicating face 8 and the glass 9 with an indicating-finger 54. Immediately in the rear of the bar 52, and rigidly mounted upon the shaft 53, is a pinion 55, with the teeth of which the teeth of the segmental rack 39 mesh. A hollow shaft 56 is rotatably mounted upon the shaft 53 and extends from the cross-bar 52 to a point near the forward end of said shaft 53. Immediately in front of the cross-bar 52, and upon this hollow shaft 56, is rigidly mounted a pinion 57. To the forward end of this hollow shaft 56 on the outside of the indicating dial or face 8, is rigidly secured an indicating finger 58. The teeth of the segmental rack 37, previously referred to, mesh with the teeth of this pinion 57. The face or dial 8 is provided with a series of equidistant price marks, and also with a series of equidistant weight marks. These price marks are designated by the numeral 59, and the weight marks by 60. The finger 58 indicates the price marks and the finger 54 indicates the weight marks.

The operation of my device is as follows: When weight is placed upon the platform 22, the vertical bars 13, 14 and 16 will move downwardly and thus cause the rear ends of the beams 29 and 30 and beam 34 to move with them, and thus cause their forward ends to move upwardly, for the reason that said beams 29, 30 and 34 are pivoted approximately at their central points. As the vertical bars 36 and 38 are moved upwardly, they will in turn partially rotate the segmental racks 37 and 39. These meshing with the pinions 55 and 57 will cause said pinions to rotate, and they by reason of being mounted upon the central shaft 53 and hollow shaft 56, to which the indicating fingers 54 and 58 are secured, will cause said fingers to rotate.

To more clearly illustrate the working of my improved weighing and price scale, I will presume that a buyer desires twelve and one-half pounds of some commodity, the selling price of said commodity being eight cents per pound. The salesman moves the indicating finger 40 so that said finger points directly to the numeral "8" upon the scale B marked upon the scale-bar A. This will bring the fulcrum 42 of the beam 29 some distance from the pivot point between said beam 29 and vertical bar 36. The commodity now being placed upon the platform 22, by reason of the adjustment of the scales, the indicating finger 54 will indicate twelve and one-half pounds upon the dial or face of the indicator 8. By reason of the fulcrum 42 being at its set distance from the pivot points 31 and 32 of the beam 29, the indicating finger 58 will indicate "100" upon the dial or face 8, or automatically multiply the number of pounds of commodity by the price per pound, thus giving the total cost of the twelve and one-half pounds of commodity.

Perfect adjustment may be given the longitudinal beams 29 and 30 by the sliding weights 33; also adjustment may be given those beams and bars that form the weighing part of the scales by the longitudinally adjustable bearings 50 and also by the winged-nut 18 and screw-bolt 19, said screw-bolt 19 taking up or letting out any lost or surplus tension of the spring 21. Thus it will be seen how I have provided a cheap, efficient and practically automatic weighing and price scale.

What I claim is—

1. In a weighing and price scale, a rectangular base frame having the upwardly extending portions at each end, a series of vertically movable bars connected at their lower ends by a cross-bar, a series of longitudinally extending beams and bars pivoted to these vertical bars, two vertical bars pivoted to the forward ends of these longitudinal bars, and segmental racks operated by these vertically extending bars, a pinion mounted upon a shaft, the teeth of which mesh with the teeth of one of the segmental racks, a hollow shaft mounted on this central shaft, a pinion mounted upon this hollow shaft, the teeth of which mesh with the remaining segmental rack, and two indicating fingers mounted upon the central shaft and the hollow shaft, all to operate in the manner described and for the purposes stated.

2. The combination in a weighing and price scale of a base or casing having a horizontal guide, a longitudinally adjustable fulcrum, engaging said guide and consisting of a pointer or finger having its lower portion bifurcated, a disk pivoted within said bifurcation, said disk having a rectangular opening through its body portion and a bar or beam engaging said opening, substantially as shown and specified.

3. In a weighing and price scale, the vertically and longitudinally adjustable fulcrum, comprising a rectangular frame provided with an upwardly extending portion, said upwardly extending portion provided with a slot, a screw-threaded shaft located near the forward portion of the frame and having a head located on the outside of said rectangular frame, and a rectangular block mounted upon said screw-threaded shaft and provided with an upwardly inverted V-shaped portion, substantially as shown and specified.

4. In a weighing and price scale, the combination of a rectangular base 1 having the upright portions 3 and 4 and the vertically moving bars 13, 14 and 16, the longitudinally extending beams 29 and 30 and 34 pivoted to the vertical bars, the longitudinally adjustable fulcrum for the beam 29, and the vertically and longitudinally adjustable fulcrum for the beam 34, the vertical bars pivoted to the forward ends of the longitudinal beams 29, 30 and 34, segmental racks 37 and 39 operated by said vertical bars, a central shaft, a pinion and indicating finger mounted on said central shaft, a hollow shaft mounted on said central shaft, and a pinion and indicating finger mounted on said hollow shaft, all to operate in the manner set forth and for the purposes specified.

In testimony whereof I affix my signature in presence of two witnesses.

WILLIAM R. STOVER.

Witnesses:
  W. J. SANKEY,
  JNO. C. HIGDON.